(12) United States Patent
Ker et al.

(10) Patent No.: US 11,354,285 B2
(45) Date of Patent: Jun. 7, 2022

(54) BULK DUPLICATION DETECTION SUPPORTING DATA ENCRYPTION

(71) Applicant: salesforce.com, inc., San Francisco, CA (US)

(72) Inventors: Chenghung Ker, Burlingame, CA (US); Danil Dvinov, Oakland, CA (US); Parth Vijay Vaishnav, Newark, CA (US); Swaroop Shere, Dublin, CA (US); Alexandre Hersans, Walnut Creek, CA (US)

(73) Assignee: salesforce.com, inc., San Francisco, CA (US)

( * ) Notice: Subject to any disclaimer, the term of this patent is extended or adjusted under 35 U.S.C. 154(b) by 146 days.

(21) Appl. No.: 16/848,878

(22) Filed: Apr. 15, 2020

(65) Prior Publication Data

US 2021/0326311 A1    Oct. 21, 2021

(51) Int. Cl.
*G06F 16/215*  (2019.01)
*G06F 21/60*   (2013.01)
*G06F 16/28*   (2019.01)
*H04L 9/06*    (2006.01)

(52) U.S. Cl.
CPC .......... *G06F 16/215* (2019.01); *G06F 16/285* (2019.01); *G06F 21/602* (2013.01); *H04L 9/0618* (2013.01)

(58) Field of Classification Search
CPC .... G06F 16/215; G06F 16/285; G06F 21/602; H04L 9/0618; H04L 2209/46; H04L 9/0894
See application file for complete search history.

(56) References Cited

U.S. PATENT DOCUMENTS

| 8,259,934 B2* | 9/2012 | Karroumi | H04L 9/0637 380/37 |
| 2018/0025059 A1* | 1/2018 | Batchu | G06F 16/24564 707/740 |

OTHER PUBLICATIONS

Bellare, Deterministic and Efficiently Searchable Encryption, 2007, pp. 535-552 (Year: 2007).*

* cited by examiner

*Primary Examiner* — Albert M Phillips, III (57) ABSTRACT

Provided herein are system, methods and computer program products for identifying duplicate records stored in a database system, comprising: generating a plurality of encrypted match indexes for each of a plurality of records stored in the database system, each of the plurality of encrypted match indexes encrypts a value of each encryption enabled field of a respective one of the plurality of records defined by at least one match rule, creating a cluster of records comprising at least one set containing at least two records of the plurality of records, the at least two records having respective encrypted match indexes corresponding to the at least one match rule, causing identification of duplicate records in the at least one set according to detection of records of the at least one set having respective match indexes matching the at least one match rule, and outputting an indication of the identified duplicate records.

18 Claims, 4 Drawing Sheets

BULK DUPLICATION DETECTION SUPPORTING DATA ENCRYPTION

TECHNICAL FIELD

The present disclosure relates generally to identifying duplicate information in a database system and more specifically to bulk duplicate detection of database system records comprising encrypted fields.

BACKGROUND

An extremely large number of organization and individual manage their relationships with their customers, suppliers, contractors, and/or other functionalities using Customer Relationship Management (CRM) systems and services.

The CRM solution may include a wide-range of features such as contact management, sales management, productivity tools, leads surveys, opportunities tracking and much more to improve tracking and support analysis of interactions with customers and potential customers. The CRM systems and services may therefore accumulate large amounts of data to support these features.

Database systems in general and database system employed by Customer Relationship Management (CRM) systems and services in particular may therefore store millions of data records.

Keeping the data stored in the database system clean, up-to-date, and free from duplicates optimizes and enhances the performance and analytical utility of the CRM solution. However, cleaning the data may present major challenges. For example, for purposes of data security, where customers need to encrypt data with an encryption key they control, CRM solutions may encrypt particular data fields or entities at-rest with the customer's encryption key. Such tenant-level encryption may further complicate duplicate detection and elimination in the CRM systems and services.

BRIEF DESCRIPTION OF THE DRAWINGS

Some embodiments are herein described, by way of example only, with reference to the accompanying drawings. With specific reference now to the drawings in detail, it is stressed that the particulars are shown by way of example and for purposes of illustrative discussion of some embodiments. In this regard, the description taken with the drawings makes apparent to those skilled in the art how some embodiments may be practiced.

In the drawings.

DETAILED DESCRIPTION

According to a first aspect a computer implemented method of identifying duplicate records from a database system comprises: generating a plurality of encrypted match indexes for each of a plurality of records stored in the database system, each of the plurality of encrypted match indexes encrypts a value of each encryption enabled field of a respective one of the plurality of records defined by one or more match rules, creating a cluster of records comprising one or more sets each containing at least two records of the plurality of records, the at least two records having respective encrypted match indexes corresponding to a respective match rule, causing identification of duplicate records in one or more of the sets according to detection of records of the respective set having respective match indexes matching the respective match rule, and outputting an indication of the identified duplicate records.

According to a second aspect a database system for automatically identifying duplicate records comprises: a database storing a plurality of records, a storage storing a code, and one or more processors coupled to the storage for executing the code. The code comprises: code instructions to generate a plurality of encrypted match indexes for each of a plurality of records stored in the database system, each of the plurality of encrypted match indexes encrypts a value of each encryption enabled field of a respective one of the plurality of records defined by one or more match rules, code instructions to create a cluster of records comprising one or more sets each containing at least two records of the plurality of records, the at least two records having respective encrypted match indexes corresponding to a respective match rule, code instructions to cause identification of duplicate records in one or more of the sets according to detection of records of the respective set having respective match indexes matching the respective match rule, and code instructions to output an indication of the identified duplicate records.

According to a third aspect a computer program product comprises computer readable program code to be executed by one or more processors when retrieved from a non-transitory computer readable medium. The program code comprising code instructions to: generate a plurality of encrypted match indexes for each of a plurality of records stored in a database system, each of the plurality of encrypted match indexes encrypts a value of each encryption enabled field of a respective one of the plurality of records defined by one or more match rules, create a cluster of records comprising one or more sets each containing at least two records of the plurality of records, the at least two records having a respective encrypted match indexes corresponding to a respective match rule, cause identification of duplicate records in one or more of the sets comprising according to detection of records of the respective set having respective match indexes matching the respective match rule, and output an indication of the identified duplicate records.

In a further implementation form of the first, second, and third aspects, in case the respective match rule comprises a fuzzy match rule, the encrypted match indexes of each of the records of the respective set are decrypted, duplicate records are identified in respective set according to detection of records of the respective set having decrypted match indexes matching the respective match rule.

In a further implementation form of the first, second, and third aspects, each encryption enabled field of the respective record is detected by intercepting one or more database accesses initiated to apply the encryption to the respective field. Each database access is initiated using one or more data access objects defined by a protocol of the database system.

In a further implementation form of the first, second, and third aspects, the encryption comprises deterministic encryption.

In a further implementation form of the first, second, and third aspects, a unique identifier of the respective match rule is used as an initialization vector in an encryption scheme used to encrypt the encryption enabled fields in each of the plurality of records.

In an optional implementation form of the first, second, and third aspects, a plurality of sets comprising a common record are merged to a single set.

In an optional implementation form of the first, second, and third aspects, one or more of the duplicate records are removed from the plurality of records stored in the database system.

Organizations, companies, institutions and/or the like, collectively designated users herein after, may utilize one or more database systems to support a Customer Relationship Management (CRM) system deployed to manage relationships with customers in order to track and analyze interactions with customers, increase sales, manage contacts, and better plan for the future. The CRM system, for example, Salesforce and/or the like may be used to organize customer service flows, manage and monitor supply-chains and monitor social media streams to determine potential customers. By tracking interactions with customers through such a CRM system, organizations may ultimately improve profitability, eliminate process inefficiencies, and/or otherwise improve organizational competence.

The CRM system may utilize the database system to store a plurality of data records comprising assorted and multitudinous data fields related to the organization, sales, customers, suppliers, competitors, leads, and/or the like. The data fields in such records may pertain to, for example, contact information, customer preferences, social media data, customer purchase records, service records, customer interactions, marketing campaigns, sales targets, organizational objectives, sales data, profitability analyses, sales leads/opportunities, etc. The data fields may be standard fields, e.g., contacts, accounts, leads, and opportunities, or custom fields designed and utilized by users for a particularized purpose tailored to their own organizational requirements.

Moreover, the CRM system may use one or more multi-tenant database systems, specifically cloud based multi-tenant database systems in which various hardware and/or software elements of the database system may be shared by one or more of the users (customers). For example, a given application server and/or platform executed to provide a front end for on-demand service to the multi-tenant database system may simultaneously process requests for a great number of users, and a given database table in the multi-tenant database system may store rows for a potentially much greater number of users.

The database systems, for example, a server, c computing node, a cluster of computing nodes, a cloud computing platform and/or the like may include one or more relational databases supporting Structured Query Language (SQL) interfaces such as, for example, ORACLE®, DB2® by IBM and the like. However, the database systems may also include one or more NoSQL database systems which are non-relational databases and do not follow the SQL specification, for example, HBase, Accumulo, Cassandra, Scylla and/or the like. Moreover, the database systems may further include one or more NoSQL databases, for example, HBase coupled with one or more access services, tools and/or applications which convert the SQL interface to a non-SQL interface such as, for example, Apache Phoenix and/or the like.

Because of the potentially sensitive and/or private nature of the data stored in the database system and moreover in the multi-tenant database system which is shared with other users, the database system may be configured to support data encryption for one or more fields of the plurality of data records stored in the database system.

Encrypting the data fields may be done using a key and an initialization vector while translating the otherwise readable alphanumeric data (i.e., plaintext) of a data field into an encrypted form (i.e., ciphertext) that is not readable to parties not privy to the key and the initialization vector. The database system then stores the encrypted form of the ciphertext. When retrieving the stored data, the ciphertext in the encrypted data fields may be decrypted using the respective key and initialization vector.

Encryption may be enabled for both standard and custom data fields. The users may further select between a plurality of encryption schemes (methodologies), for example, deterministic encryption, probabilistic encryption and/or the like to encrypt one or more of the data fields in the records stored in the database system. A deterministic encryption scheme always produces the same ciphertext for a given plaintext and key while a probabilistic encryption scheme utilizes randomness in the encryption process, resulting in a different ciphertext for the same plaintext and key.

It may be highly desirable to maintain clean and coherent data in the database system in order to improve usability, prevent errors, maintain system integrity, enhances analytical capabilities and/or the like. Moreover, maintaining clean and coherent in the database system may significantly reduce utilization of computing resources required to maintain, manage and/or traverse the data stored in the database system, for example, processing resources, processing time, storage resources, network resources and/or the like.

A major aspect of maintaining clean and coherent data in the database system is identification and elimination of duplicate records in a given data set stored in the database system. Duplicate detection may be managed globally by running duplicate elimination (de-duplication) jobs. Duplicate detection may also occur on a table-by-table or case-by-case basis. Duplicate detection may occur automatically when adding a new record to the cloud computing platform.

Moreover, to improve efficiency and reduce computing resources, detection of duplicate records may be done for bulks of records using one or more bulk operations and/or bulk jobs supported by the database system and/or the application server and/or platform serving the database system, for example, bulk load, bulk upsert, bulk copy and/or the like.

Duplicate records in the database system may be detected using match rules which may each define examining one or more data fields in the stored records. A match rule may be standard or custom (i.e., user-defined). A standard match rule may examine pre-determined fields for a given data entity of the database system, for example, an object comprising a plurality of records to determine if a duplicate exists. For example, a standard match rule on a contacts object in the database system may examine FirstName, LastName, and Address. A custom match rule may examine user-configured fields. For example, a custom, user-defined match rule on the contacts object may be configured to also consider a contact's Title. In this custom rule, a duplicate may be determined if FirstName, LastName, Address, and Title match. The match rules may be specified, defined and applied in the database system using programmatic means, tools, interfaces and/or the like available by the database system as known in the art.

Duplicate detection may employ exact matching and/or fuzzy matching. In an exact match scheme, only exact matches in the data fields specified by the match rule return a positive result, i.e. a match. For example, assuming a certain exact match rule examines a FullName field to detect duplicate records, "John Smith" and "John Smith" are determined to match while "John Smith" and "Jon Smith" do not match. The fuzzy matching allows for non-exact matches to be positively identified as a duplicate. Following the example above, "Jon Smith" may be positively identified as a duplicate of "John Smith" using a fuzzy matching match rule. The fuzzy matching may include one or more fuzzy matching schemes and/or algorithms, for example, Jaro-Winkler, Kullback-Liebler distance, name variant, keyboard distance, Meta.phone 3, syllable alignment and/or the like.

Provided herein are system, apparatus, device, method and/or computer program product embodiments, and/or combinations and sub-combinations thereof, for bulk duplicate detection of database system records comprising encrypted fields.

The records stored in the database system are first indexed according to each of one or more match rules (exact or fuzzy) activated for the database system, in particular match rules which define examination of one or more fields in the records which are enabled for encryption. The encrypted fields may be detected by intercepting one or more access operations to the database system, for example, read, write, load, and/or the like which are typically done using one or more Data Access Objects (DAO) defined by a protocol of the database system to provide abstraction of the high level logic from the low level physical interfaces. One or more of the DAOs may be therefore monitored to detect and intercept access operations to the database, and thus identify accesses related to encrypted enabled fields in the records stored in the database system.

The indexing of the records in the database system is based on creating, for each match rule, a respective encrypted match index for each of the records. It should be noted that this may only apply to fields enabled for deterministic encryption which may be deterministically repeated and may not apply to probabilistic encryption enabled fields which may not be deterministically repeated.

The encrypted match index created for each record according to a respective match rule may aggregate the ciphertext of the encrypted fields in the respective record which are defined by the respective match rule. As described herein before, the encryption may be done using an initialization vector which is based and/or derived from an identifier (ID) of the respective match rule.

The encrypted match indexes created according to each of the match rules may be stored in one or roe match records, for example, a match table, a match column and/or the like. As such the plaintext value of the fields enabled for encryption is never exposed or stored in the database system. Rather, the match rule indexes stored in the database system comprise only the ciphertext value and/or aggregation of ciphertext values thus ensuring protection and safety of the potentially sensitive and/or private data in the encrypted fields.

In order to identify duplicate records in the database system, one or more operations, specifically bulk operations and/or bulk jobs initiated to process bulks of records, may be initiated to process the match record(s) created for the activated match rule(s) in order to identify one or more records having respective match rule indexes which match each other.

A cluster of records may be created for each match rule. The cluster may include one or more sets of records where each set includes a plurality of records having respective encrypted match indexes corresponding to the respective match rule.

For match rules defining exact matching duplicate records detection may be done by simply detecting encrypted match indexes which match each other. However, in case of match rules defining fuzzy match, there may not be a direct match between fields which store similar content but in different representations, for example, upper/lower case, missing symbols (typos, etc.), alternative representations and/or the like. In such case the encrypted match indexes may be decrypted and temporarily stored in volatile memory only. Deep matching may be then applied to identify duplicate records by comparing the decrypted match indexes to detect matching values which may indicate that the respective records are duplicates. After the records duplication detection is complete, the decrypted match indexes are discarded (removed, deleted, etc.) from the volatile memory this ensuring that the plaintext data is not compromised.

After completing all active match rules are processed to identify duplicate records, an indication of the duplicate records may be output to one or more automated systems, tools, applications and/or platforms which may initiate one or more operations accordingly. For example, a plurality of sets comprising one or more common records may be merged to a single set. In another example, one or more duplicate records may be discarded (removed, deleted, etc.) from the database system.

Supporting encryption enabled bulk duplicate detection of duplicate records stored in the database system with encrypted fields may present major benefits and advantages compared to existing database management systems.

First, some of the existing database management systems which may support duplicate detection based on comparison of plaintext value fields may be unable to detect duplicate records according to match rules relating to encryption enabled fields since similar plaintext values may yield different ciphertext values. Such database management systems may therefore need to either prevent encryption in order to support clean and coherent data storage and/or high performance of database operation or enable encryption at the expense of reducing and potentially giving up the capability to identify duplicate records. The encryption enable bulk duplicate detection on the other hand may allow for encrypting one or more fields comprising sensitive and/or private information while supporting efficient duplicate detection of records stored in the database system.

Moreover, while some of the existing database management systems may support duplicate detection for records comprising encrypted fields, such database management systems may typically perform the duplicate detection on a record by record basis. Such individual processing may result in extensive processing time and/or significantly high utilization of comporting resources which may essentially degrade the capability of the database system to serve accesses and may thus significantly reduce its performance. In contrast, the encryption enabled bulk duplicate detection may support the highly efficient and time preserving bulk operations (jobs) which may be carried out using the match record(s) created to include the encrypted match indexes of the records according to each of the match rule activated for the database system. As such one or more devices, systems and/or platforms hosting, managing and/or maintaining the database system may utilize significantly reduced computing resources, for example, processing resources, processing time, storage resources, networking resources and/or the like to identify duplicate records of records comprising encrypted fields.

Furthermore, the encryption enabled bulk duplicate detection may be easily adapted and/or adjusted with minimal effort and time to support practically any type of database system, both relational databases supporting SQL as well as non-relational and/or NoSQL databases systems which do not natively support SQL. This capability and flexibility is achieved by two main implementation concepts applied in the encryption enabled bulk duplicate detection. First, the detection of the encrypted enabled fields takes advantage of the abstraction layer of the database system to monitor the DAOs and intercept accesses to the database system, only the low level physical access interface may need to be adjusted. The low level physical access interfaces are simple and may be easily adjusted, adapted and/or adopted compared to the high level logic of the database system. For example, the encryption enabled bulk duplicate detection may be easily ported and integrated in one or more NoSQL database systems, for example, HBase, Accumulo, Cassandra, Scylla and/or the like by monitoring the DAOs of the access service used with the NoSQL database system, for example, Apache Phoenix and/or the like and intercepting accesses relating to encryption enabled fields in the records stored in the NoSQL database system. The second implementation concept is the fact that the encryption enabled bulk duplicate detection is based on the match records created for the activated match rules. These match records may be easily and simply adapted and/or adjusted according to the protocols, interfaces, functionality, practices and/or conventions applicable for each database system, specifically with respect to bulk operations and bulk jobs. The easy adaptation, minimal effort, extremely short time and/or reduced computing resources required to port and adjust the encryption enabled bulk duplicate detection to a database system may enable very high scalability and wide adoption of the encryption enabled bulk duplicate detection in a plurality of existing and new database systems.

In addition, in case deep matching is required, the data stored in the encrypted fields may be decrypted and temporarily only in volatile memory and only for the duration of the deep matching process thus ensuring that no private and/or sensitive data is persistently stored hence preventing potentially malicious which may infiltrate the database system from compromise the data stored in the encrypted fields.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

Some embodiments relate to machine learning models and, more specifically, but not exclusively, to systems and methods establishing a communication session between users of a social network selected using a machine learning model.

An aspect of some embodiments of the systems, methods, apparatus, and/or code instructions (stored on a memory and executable by one or more hardware processors) relate to training a machine learning model for computing distance scores indicative of similarity between profiles of users of a social network, for matching two users of the social network. A communication session may be established between client terminals of the similar users. User feature profiles are extracted for multiple users of a social network hosted by social network server(s). Each user feature profile is structured and includes multiple user features extracted from unstructured user generated text (e.g., content typed by the user and posted on their personal profile), indications of participation in groups (e.g., special interest interactive groups of multiple users of the social network), and structured user profiles (e.g., name, position, geographic location). A clustering-component of the model is trained to cluster the user feature profiles. The clustering-component may be trained, for example, by selecting a certain number of clusters and/or by selecting which user features of the user feature profile to use for clustering. Optionally, the clustering is unsupervised. A matching-component of the model is trained to compute a distance score indicative of statistical similarity between a feature profile of a target user and features profiles of other users of the same cluster. The matching-component is trained using a training dataset of pairs of user feature profiles extracted from common clusters, each pair assigned a distance score label. The user features used for computation of the distance score may be selected and/or assigned different weights. Pairs of users that are considered more similar may be assigned lower distance scores in comparison to pairs of users that are considered less similar. The trained model is provided for identifying a certain cluster of a certain user (e.g., in response to a user issued request), using the clusters created by the trained clustering-component. Distance scores between the user feature profile of the certain user and other user feature profiles of other users of the certain cluster are computed by the trained matching-component. The distance scores may be used for selecting a subset of the other users of the cluster. For example, the users are ranked (e.g., starting from lowest distance score indicating the best match) according to distance scores, and the top 3 (or other number) of best ranked users are presented to the initiating user for selection of one user. A communication session, for example, an instant-messaging application and/or video conference call, may be established between an initiating client terminal of the certain user and the target client terminal of the user selected by the initiating client terminal from the subset.

An aspect of some embodiments of the systems, methods, apparatus, and/or code instructions (stored on a memory and executable by one or more hardware processors) relates to computing distance scores indicative of similarity between profiles of users of a social network using a trained machine learning model, for matching two users of the social network. A communication session may be established between an initiating client terminal and a target client terminal of the users corresponding to the matched user profiles. A request is received from an initiating client terminal of a certain user of a social network hosted by a social network server(s). A certain cluster computed by a clustering-component of the model is accessed. The certain cluster stores feature profiles of the certain user and other users of the social network. Each user feature profile is structured, including user features extracted from unstructured user generated text, indications of participation in groups, and structured user profiles. A matching-component of the model computes a distance score indicative of statistical similarity between a feature profile of the certain user and the features profiles of other users included in the certain cluster. A subset of users having best scores (e.g., lowest ranking scores) indicating best matches may be presented on the initiating client terminal. A selection of one user of presented subset is made by the user. The communication session is established between the initiating client and the target client terminal of the selected user.

Figure 1:
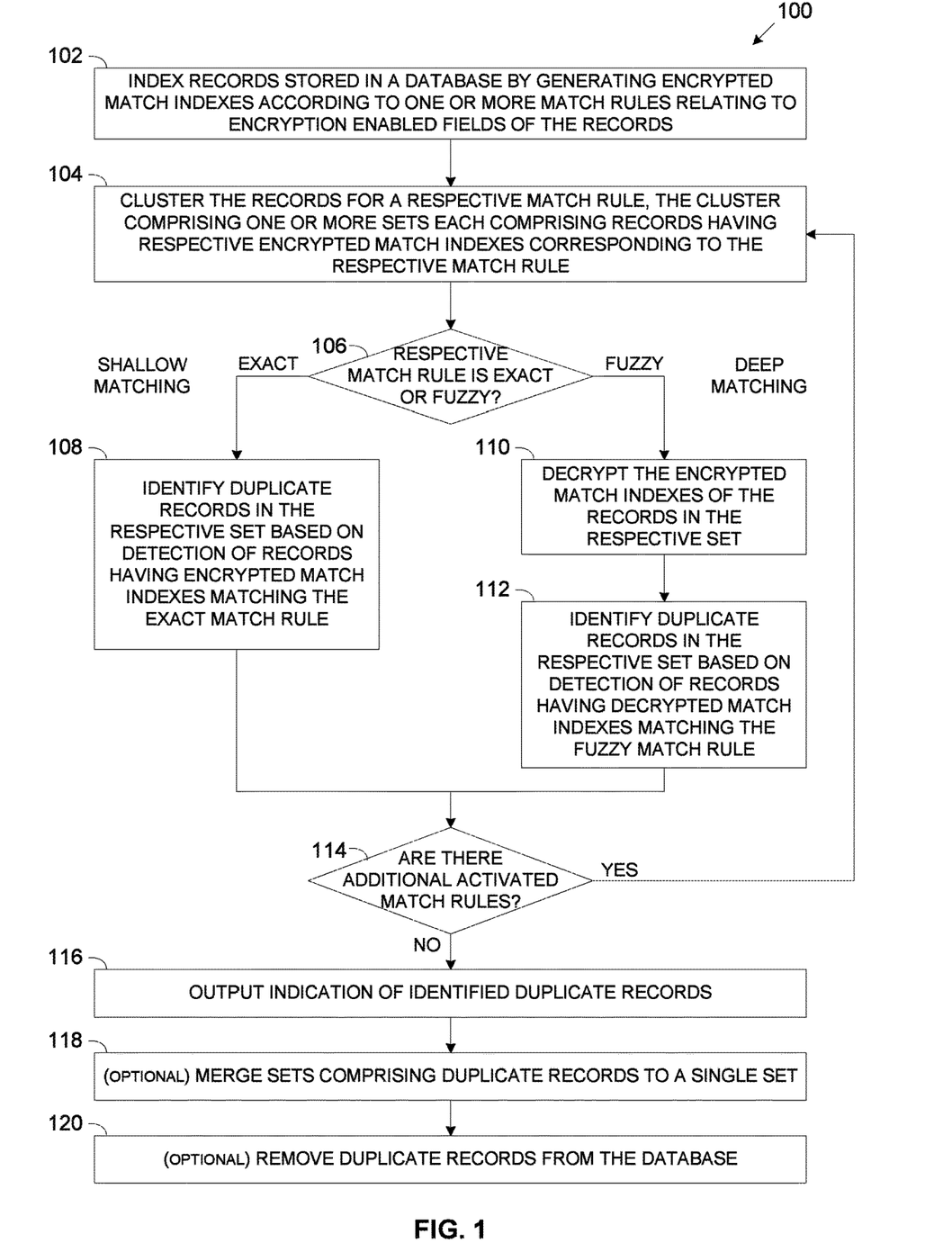
FIG. 1 is a flowchart of an exemplary process of automatically identifying duplicate records in a database system using bulk operations for records comprising encrypted fields, in accordance with some embodiments.

Referring now to the drawings, FIG. 1 is a flowchart of an exemplary process of automatically identifying duplicate records in a database system using bulk operations for records comprising encrypted fields, in accordance with some embodiments. An exemplary process 100 may be executed to identify duplicate records in a database system, specifically by initiating bulk operations and/or bulk jobs to process a large number of records comprising fields which are encrypted to protect sensitive and/or private information.

Figure 2:
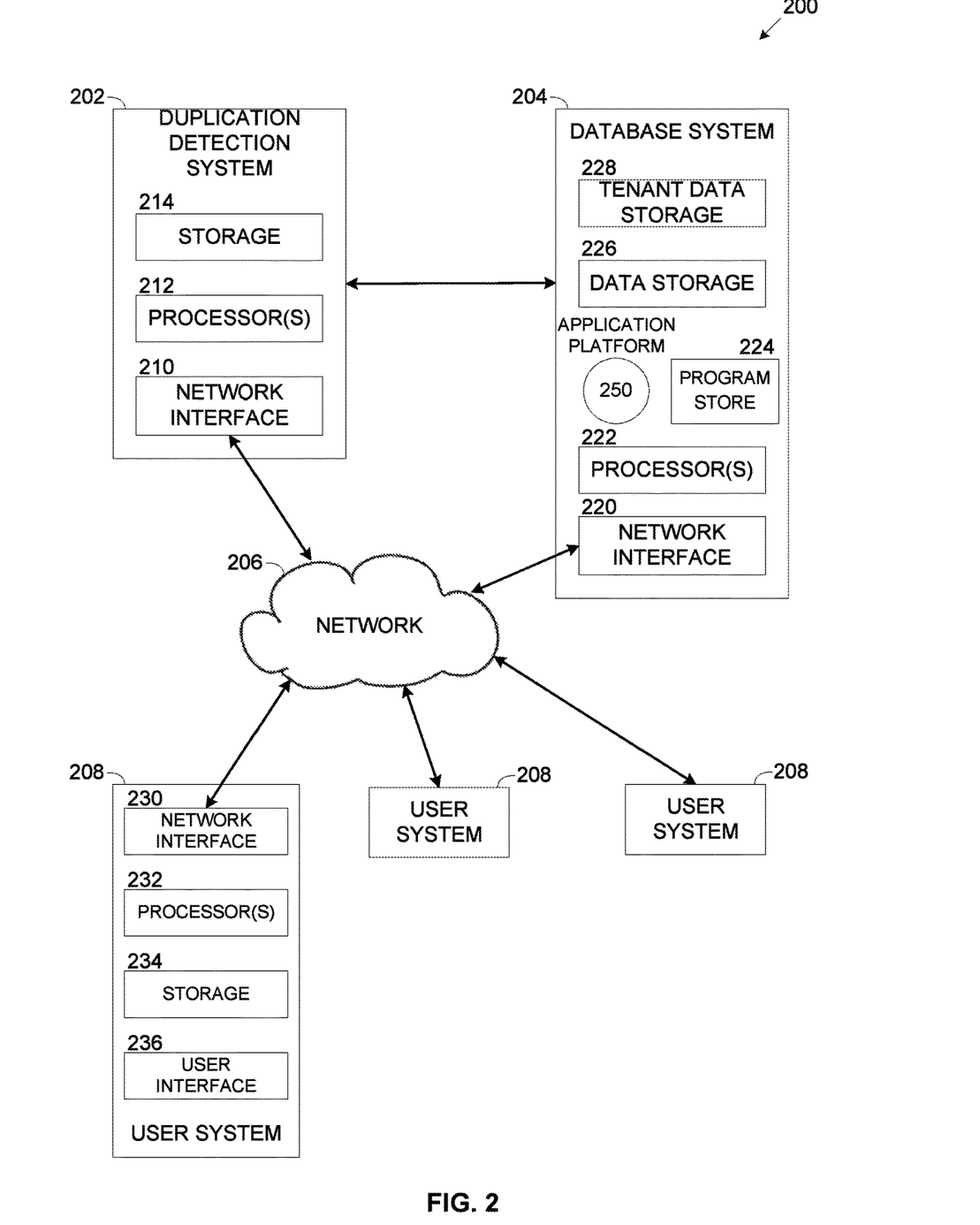
FIG. 2 is a schematic illustration of an exemplary database environment for automatically identifying duplicate records in a database system using bulk operations for records comprising encrypted fields, in accordance with some embodiments.

Reference is also made to FIG. 2, which is a schematic illustration of an exemplary database environment for automatically identifying duplicate records in a database system using bulk operations for records comprising encrypted fields, in accordance with some embodiments.

A database environment 200 for providing database service may include a duplicate detection system 202, for example, a server, a computing node, a cluster of computing modes and/or the like configured to identify duplicate records stored in a database system 204 storing a plurality of records.

The database system 204, for example, a server, c computing node, a cluster of computing nodes and/or the like may include one or more relational databases supporting SQL interfaces such as, for example, ORACLE®, DB2® by IBM and the like. The database system 204 may further include one or more NoSQL database systems which are non-relational databases and may not follow the SQL specification, for example, HBase, Accumulo, Cassandra, Scylla and/or the like. Moreover, one or more of the NoSQL database systems 204, for example, the HBase database may be coupled with one or more access services, tools and/or applications applied, for example, Apache Phoenix and/or the like configured to convert SQL interfaces and/or accesses to respective non-SQL interfaces and/or accesses.

The database system 204 may be utilized and/or employed to support a CRM system, for example, Salesforce and/or the like of one or more users. The CRM system may be used to allow the users to manage business relationships and information associated with the business relationships, to track and analyze interactions with their customers and/or the like. In such case, the database system 204 may store CRM information, for example, customer and prospect contact information, accounts, leads, and opportunities. The CRM information may be stored in the database system 204 as objects. For example, the CRM system may include "account" object, "contact" object and "opportunities" object.

Moreover, the database 204 used by the CRM system may include one or more multi-tenant database systems in which various hardware and/or software elements of the database system 204 may be shared by one or more users (customers), for example, an organization, a company, an institution, and/or the like.

One or more of the users may use respective user systems 208, for example, a server, a computer, a mobile device (e.g. Smartphone, tablet, etc.), a web browser, or any other suitable computing device to access, via a network 206, the CRM system, specifically the database system 204 employed by the CRM system. Moreover, one or more of the users using their user systems 208 may further access the duplicate detection system 202 to initiate one or more duplicate detection sessions and/or process for detecting duplicate records in the database system 204.

The network 206 may include on or more wired and/or wireless networks, for example, a Local Area Network (LAN), a Wide Area Network (WAN), a wireless LAN (e.g. Wi-Fi), a cellular network, the Internet and/or various other types of networks as would be appreciated by a person of ordinary skill in the art.

The duplicate detection system 202 may include a network interface 210 for connecting to the network 206, a processor(s) 212 and a storage 214 for storing program code (instructions) and/or program data. The network interface 210 may include one or more wired and/or wireless network interfaces for connecting to the network 206. Via the network interface 210, the duplicate detection system 202 may connect and communicate with remote network resources connected to the network 206, for example, the database system 204, one or more of the user systems 208 and/or the like.

The processor(s) 212, homogenous or heterogeneous, may include one or more processors arranged for parallel processing, as clusters and/or as one or more multi core processor(s). The storage 214 may include one or more non-transitory persistent storage devices, for example, a Read Only Memory (ROM), a Flash array, a hard drive and/or the like. The storage 214 may also include one or more volatile devices, for example, a Random Access Memory (RAM) component, a cache memory and/or the like. The storage 214 may further include one or more network storage resources, for example, a storage server, a network accessible storage (NAS), a network drive, a cloud storage and/or the like accessible via the network interface 210.

The processor(s) 212 may execute one or more software modules such as, for example, a process, a script, an application, an agent, a utility, a tool, an algorithm and/or the like each comprising a plurality of program instructions stored in a non-transitory medium (program store) such as the storage 214 and executed by one or more processors such as the processor(s) 212. The processor(s) 212 may further include, utilize and/or facilitate one or more hardware modules or elements integrated in and/or coupled with the duplicate detection system 202, for example, a circuit, a component, an Integrated Circuit (IC), an Application Specific Integrated Circuit (ASIC), a Field Programmable Gate Array (FPGA), a Digital Signals Processor (DSP), an Artificial Intelligence (AI) accelerator and/or the like.

The duplicate detection system 202, specifically the processor(s) 212 may therefore execute one or more functional modules which may be implemented via one or more software modules, one or more of the hardware modules and/or a combination thereof.

The database system 204 may include a network interface 220 such as the network interface 210 for connecting to the network 206, a processor(s) 222 such as the processor(s) 212 a program store 224 such as the storage 214 which may be primarily used for storing program code and/or program data. Via the network interface 210, the database system 204 may connect and communicate with remote network resources connected to the network 206, for example, the duplicate detection system 202, one or more of the user systems 208 and/or the like.

The database system 204 may further include a data storage 226 for storing the CRM information, specifically a plurality of records typically arranged and organized in a plurality of data objects such as, for example, the "account"

object, the "contact" object, the "opportunities" object and/or other data objects defined and used by the CRM system.

The database system 205, specifically the processor(s) 222 may execute one or more functional modules which may be implemented via one or more software modules, one or more hardware modules and/or a combination thereof. For example, the database system 205, specifically the processor(s) 222 may execute an application server and/or platform 250 to provide a front end for on-demand service to the database system 204.

In case the database system 224 comprises a multi-tenant database system, the application platform 250 may simultaneously process requests for a great number of users received from multiple user systems 208, and a given database table stored in the data storage 226 may store rows for a potentially much greater number of users. Therefore, in case the database system 224 is a multi-tenant database system, it may further comprise a tenant data storage 228 for storing information relating to the plurality of tenants (users) sharing the resources of the multi-tenant database system 204, for example, storage space in the data storage 226, services provided by the application platform 250 and/or the like.

The duplicate detection system 202 and the database system 204 may be deployed, implemented and/or utilized in a plurality of architectures, deployments and/or implementations. For example, the duplicate detection system 202 may be configured to communicate and interact with the database system 204 via the network 206. In another example, the duplicate detection system 202 and the database system 204 may be located at the same site and may connect and communicate with each other via one or more direct interconnections, buses, ports, and/or interfaces.

Optionally, the duplicate detection system 202 is integrated with the database system 204. Optionally, the duplicate detection system 202 and/or the database system 204 and/or a combination of them may be implemented as one or more cloud computing services, platforms and/or system, for example, an Infrastructure as a Service (IaaS), a Platform as a Service (PaaS), a Software as a Service (SaaS) and/or the like.

Each of the user systems 208 may include a network interface 230 such as the network interface 210 for connecting to the network 206, a processor(s) 232 such as the processor(s) 212 a storage 224 such as the storage 214 for storing program code and/or program data. Via the network interface 230, the user system 208 may connect to the network 206 and communicate with one or more remote network resources connected to the network 206, for example, the duplicate detection system 202, the database system 204 and/or the like. For example, one or more of the user systems 208 may execute one or more functional modules, for example, an application, a web browser, a web application and/or the like for accessing the CRM system, specifically the CRM information stored in the database system 204. Moreover, one or more of the user systems 208 may communicate with the duplicate detection system 202 to initiate one or more sessions and/or processes for identifying and optionally removing duplicate records in the database system 204.

Figure 3:
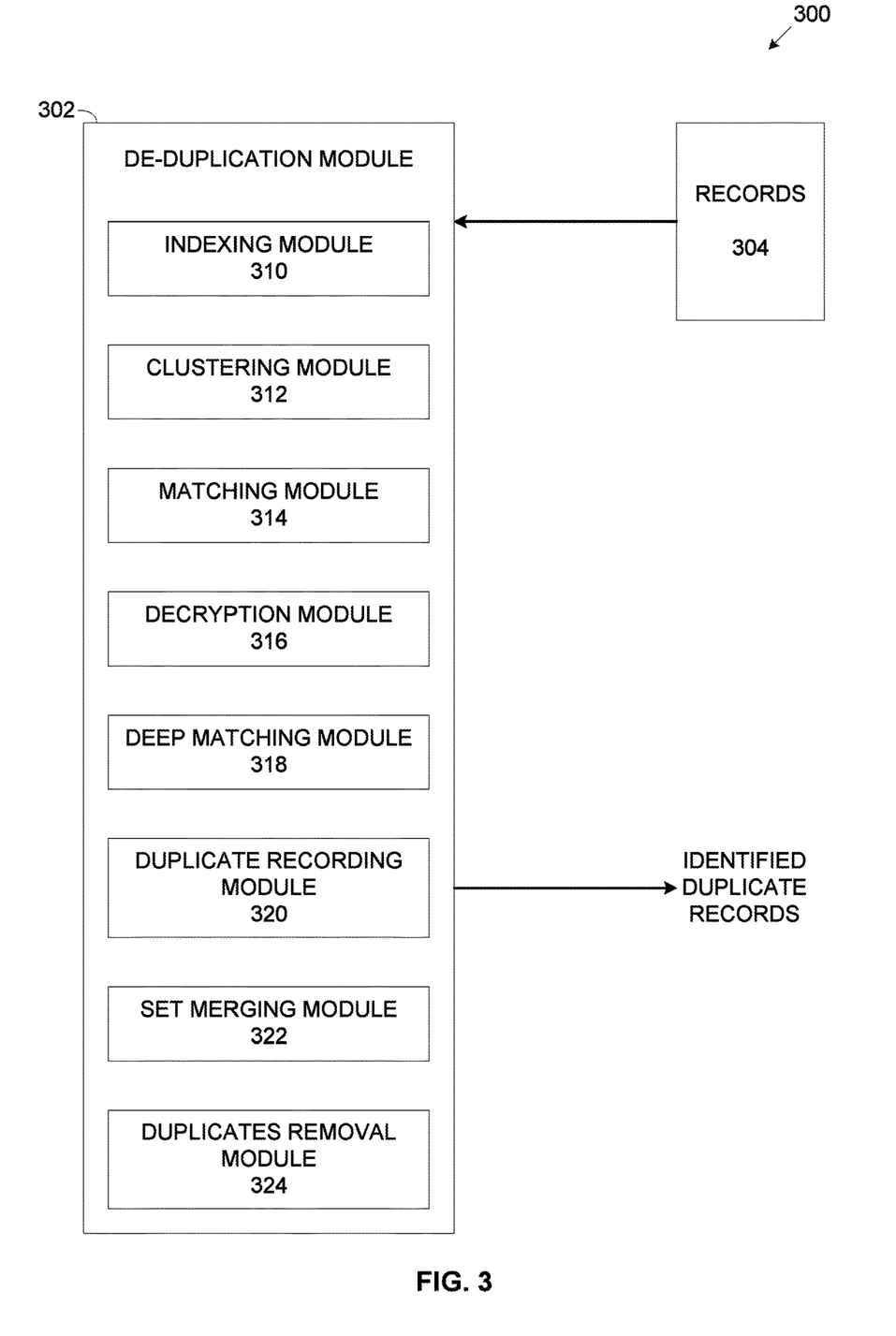
FIG. 3 is a schematic illustration of exemplary modules of a system configured to automatically identify duplicate records in a database system using bulk operations for records comprising encrypted fields, in accordance with some embodiments.

Reference is now made to FIG. 3, which is a schematic illustration of exemplary modules of a system configured to automatically identify duplicate records in a database system using bulk operations for records comprising encrypted fields, in accordance with some embodiments.

An exemplary de-duplication module 302 may be used to identify and optionally remove duplicate records, in accordance with some embodiments. The de-duplication module 302 may be associated with a computing system such as the duplicate detection system 202 which may be configured to identify duplicate records in a group of records 304, specifically a group of records stored in a database system such as the database system 204.

According to some embodiments, the group of records 304 may include records associated with a CRM system used by one or more users (customers), and the de-duplication module 302 is configured to identify the duplicate records in the group of records 304 and optionally remove them.

The de-duplication module 302 may include multiple functional modules, for example, an indexing module 310, a clustering module 312, a matching module 314, a decryption module 316, a deep matching module 318, a duplicate recording module 320, a set merging module 322 and a duplicates removal module 324. According to some embodiments, these functional modules may be executed by one or more systems, for example, the duplicate detection system 202 and may be executed, implemented and/or utilized by one or more software modules, one or more hardware modules and/or a combination thereof. Moreover, some and of the functional modules may include proprietary modules designed and configured for the specific functionality described herein after. However, one or more of the functional modules may include $3^{rd}$ party modules, applications, tools and/or services.

The indexing module 310 may be configured to index the records 304 according to one or more match rules defined and activated for the database 204, for example, match rules defined for the records stored in the CRM system objects. The indexing module 310 may create a match indexes for each of the records 304 according to each activated match rule. The indexing module 310 may further create a match record, for example, a file, a table, and/or the like comprising the plurality of match indexes of the plurality of records 304. For example, assuming a certain match rule may define a combination of a first name field and a last name field in the records 304, the indexing module 310 may create a respective match record comprising a concatenation of the values (or part thereof) of the first and last name fields of each of the records 304.

Moreover, the indexing module 310 may create an encrypted match index for each of the records 304 which encrypts the value of one or more fields which are encrypted, i.e. encryption enabled, in particular encrypted using a deterministic encryption scheme as known in the art. In the deterministic encryption schemes, the same ciphertext is produced for a given plaintext and key and therefore while the plaintext may remain secret and secure, using a deterministic encryption schemes, the same ciphertext may be repeatedly and consistently produced for the given plaintext. The indexing module 310 may use an identifier (ID) of the respective match rule as an initialization vector for the deterministic encryption scheme applied to encrypt the encryption enabled fields in the records 304.

The indexing module 310 may thus create one or more match records comprising the encrypted match indexes created for each of the records 304 according to each of the match rules activated for the database system 204 which relate to encryption enabled fields. According to some embodiment, the match record may be implemented as a match index column stored, for example, in the data entity and/or data object storing the records.

The indexing module 310 may update the match record(s) with encrypted match indexes created for each newly received or created record according to each match rule activated for the database system 204. However, upon activation of a new match rule, the indexing module 310 may traverse the records 304 and create a respective encrypted match index for each of the records 304 accordion to the newly activated match rule.

Moreover, the indexing module 310 may initiate one or more bulk operations and/or bulk jobs, for example, bulk inserts, database updates, text manipulation, or other suitable storage approach to store the encrypted match indexes in the match record, for example, the index column.

The clustering module 312 may be configured to generate multiple clusters from the group of records 304 according to the match rules activated for the database system 204, specifically match rules relating to encrypted fields in the records 304. For example, assuming the first name and the last name fields in the records 304 are encrypted and a certain match rule activated for the database system 204 defines a combination of the encrypted values in the first and last name fields. In such case, the clustering module 312 may create a cluster for the certain match, specifically using one or more bulk operations applied to the match record created to include the encrypted match indexes created for the records 304 based on their first name and last name values. The created cluster may include one or more sets each comprising multiple records from the record 304 which have encrypted match indexes corresponding to the certain match rule. For example, a first set may include a plurality of records having encrypted match indexes corresponding to "John" "Smith", a second set may include a plurality of records having encrypted match indexes corresponding to "Jack" "Robinson" and so on.

Based on the type of the respective match rule, the cluster may be processed in a shallow matching path or a deep matching path. In particular, a cluster created for an exact match rule may be processed by the matching module 314 configured for shallow matching while a cluster created for a fuzzy match rule may be first decrypted by the decryption module 316 and then processed by the deep matching module 318 which is configured for deep matching.

The matching module 314 may process the encrypted match indexes created for the plurality of records according to an exact match rule which defines (keyed to) an exact match between the respective values, specifically encrypted match indexes of multiple records of the records 304. Since the match rule defines exact matching and the values are encrypted using deterministic encryption, equal values (plaintext) in the respective fields of different records may produce equal encrypted values (ciphertext) and hence may produce equal encrypted match indexes. The matching module 314 may therefore simply traverse the encrypted match indexes of the records of each set and immediately identify duplicate records having equal encrypted match indexes. For example, encrypted match index created for the records in the first set may include a certain encrypted code corresponding to the exact plaintext values "John" and "Smith". In such case the matching module 314 may analyze the encrypted match indexes of the records of the first set and identify encrypted match indexes which equal the certain encrypted code. The matching module 314 may provide indication of identified duplicate records to the duplicate recording module 320.

However, a fuzzy match rule may not define an exact match of respective values in certain one or more fields of the records 304 but rather a more general match, for example, matching values may have similar content with different representation. For example, the first set of the cluster created according to a certain fuzzy match rule may include records having encrypted match indexes corresponding to plaintext values "John" "Smith", "john" "smith", "Jon" "Smith" and/or the like. Naturally, deterministically encrypting these different plaintext values may produce encrypted values (ciphertext) and hence different encrypted match indexes. It may be therefore impossible to apply the matching module 314 to identify duplicate records in clusters corresponding to fuzzy match rules.

In such case, the decryption module 316 may first decrypt the encrypted match indexes of the records in each set to recover the respective plaintext values and produce respective decrypted match indexes for the records 304, specifically for the records in each of the sets in the cluster. The decryption module 316 may use the ID of the respective fuzzy match rule as the initialization vector to decrypt the encrypted (encryption enabled) fields in the records 304 and provide the decrypted match indexes. The decryption module 316 may temporarily store the decrypted match indexes only in volatile memory and may discard these decrypted match indexes after the deep matching process is complete such that the decrypted values are never persistently stored and are thus secure against possible malicious attacks.

The deep matching module 318 may then process the decrypted match indexes of the records in each of the sets in the cluster to identify possible duplicate records. The decrypted match indexes may reflect that despite possible different representation, the values in the respective encryption enabled field(s) of at least some of the records in a certain set may include similar content and thus the at least some of the records may be duplicates. For example, processing the decrypted match indexes corresponding to the values John" "Smith", "john" "smith", "Jon" "Smith", the deep matching module 318 may determine that the records associated with these decrypted match indexes are duplicates. The deep matching module 318 may provide indication of identified duplicate records to the duplicate recording module 320. It is stressed again that the decrypted match indexes are discarded (deleted, removed) immediately on completion of the deep matching process.

According to some embodiments, the deep matching module 318 may be implemented, utilized and/or applied using one or more external and/or third party matching services, $3^{rd}$ party applications, tools and/or the like, for example, Pitney Bowes® (PB) Spectrum platform. It is possible that the external or third party matching service 318 may impose some requirements with respect to the number of records that can be received and processed. For example, while the group of records 304 may include a million records, the external or third party matching service 318 may only be able to perform matching operation for only a group of 100,000 records at a time. In such case, the clustering module 312 may be configured and/or adapted to feed the cluster to the external or third party matching service 318 in multiple iterations such that in each iteration a respective subset of the original cluster is fed to the external or third party matching service 318.

The duplicate recording module 320 may collect and record the duplicate records identified by the matching module 314 and/or the deep matching module 318. The duplicate recording module 320 may further output one or more indications of the identified duplicate records. For example, the duplicate recording module 320 may transmit one or more messages indicating the duplicate records to one or more of the user systems 208, for example, a user system 208 operated and/or associated with an Information Technology (IT) officer of the users, an operator and/or the like.

In another example, the duplicate recording module 320 may transmit one or more messages indicating the duplicate records to one or more automated systems, services and/or platforms which may initiate one or more operations and/or actions accordingly, for example, remove one or more of the duplicate records, merge sets of duplicate records and/or the like.

The set merging module 322 may merge together one or more sets of the cluster to a single set in case the set merging module 322 determines that at least some of the records included in one set are duplicates of records included in one or more other sets. For example, assuming a first set comprises a first record of the records 304 and one or more first additional records determined to be duplicates of the first record. Further assuming a second set comprises a second record of the records 304 and one or more second additional records determined to be duplicates of the second record. In case the set merging module 322 determines that the first record and the second record are duplicates, the set merging module 322 may apply set collapsing and merge the first and second sets to a single set. The set merging module 322 may merge (collapse) the first and second sets to a single set because if the first record is a duplicate of the first additional record(s) and the since if the second record is a duplicate of the second additional record(s) and the first and second records are duplicates, then the first additional record(s) and the second additional record(s) are also duplicates.

The duplicate removal module 324 may remove from the database system 204 one or more of the duplicates of records identified by the matching module 314 and/or the deep matching module 318 and recorded by the duplicate recording module 320.

Reference is made once again to FIG. 1.

Some of the steps of the process 100 may be performed simultaneously, or in a different order than shown in FIG. 1, as will be understood by a person of ordinary skill in the art. The process 100 is described with reference to FIG. 3, however, the process 100 is not limited to that exemplary embodiment.

As shown at 102, a plurality of records stored in a database may be indexed according to one or more match rules, specifically match rules relating to (keyed for) one or more encryption enabled fields of the records which may store sensitive and/or private information.

According to some embodiments, the indexing may be done to records such as the group of records 304 by an indexing module such as the indexing module 310 executed, implemented and/or utilized in a duplicate detection system such as the duplicate detection system 202 configured to identify duplicate records in a database system such as, for example, the database system 204 which may be a multi-tenant database system used by and/or associated with a CRM system providing CRM services to one or more users using respective user systems such as the user systems 208.

The indexing module 310 may identify the encryption enabled fields by intercepting one or more access operations to the database system, for example, read, write, load, upsert, and/or the like which are typically done using one or more DAOs defined by a protocol of the database system 204 and/or the access service used to access the database system 204, for example, Apache Phoenix configured to enable SQL like access to a non-relational and/or NoSQL database system 204, for example, HBase and/or the like. Since the low level simple DAOs may be easily adjusted and configured, they may be configured to allow monitoring and interception of accesses relating to encryption enabled fields thus allowing the indexing module 310 to monitor, hook and/or attach to the DAOs to intercept such operations and identify which of the records fields are encryption enabled, specifically enabled for deterministic encryption.

The indexing module 310 may both encrypt each encryption enabled field in each of the records, specifically fields enabled for deterministic encryption and index the records according to each match rule activated for the database system 204, specifically match rules relating to the deterministic encryption enabled fields in the records.

The indexing module 310 may encrypt the value in the encryption enabled field using the deterministic encryption scheme and a respective key associated with the users whose data is processed.

The indexing module 310 may index the records according to each activated rule by creating one or more encrypted match indexes for each of the records according to each of the activated match rules relating to the deterministically encrypted fields. Each of the encrypted match indexes is created based on the value in each of the one or more of the encryption enabled field(s) defined for matching by the respective match rule. The indexing module 310 may create the encrypted match indexes based on the value of the encryption enabled field(s) using the deterministic encryption scheme with the ID of the respective match rule serving as the initialization vector.

For example, assuming there are five records stored in the database system 204 each comprising a first name field and a last name fields, for example, "John Dear", "Johnny Dear", "Clifford Smith", "Cliff Smith" and "Danny Ho". Further assuming a certain match rule defines examination of a combination of an initial (letter) of the first name field and the last name filed. In such case, the indexing module 310 may create the encrypted match index for each of the five records based on the value of the first name initial combined with the last name value, i.e. [JDear], (JDear], [CSmith], [CSmith] and [DHO].

The indexing module 310 may further create one or more match records, for example, a file, a table (e.g. INDEX_AND_RECORD_DATA table), and/or the like to store the encrypted match indexes created for each of the records.

The encrypted match indexes may be created for each newly received or created record according to each match rule activated for the database system, in addition, upon activation of a new match rule, respective encrypted match indexes may be created for each of the records based on the encrypted field(s) defined by the newly activated match rule.

Figure 4:
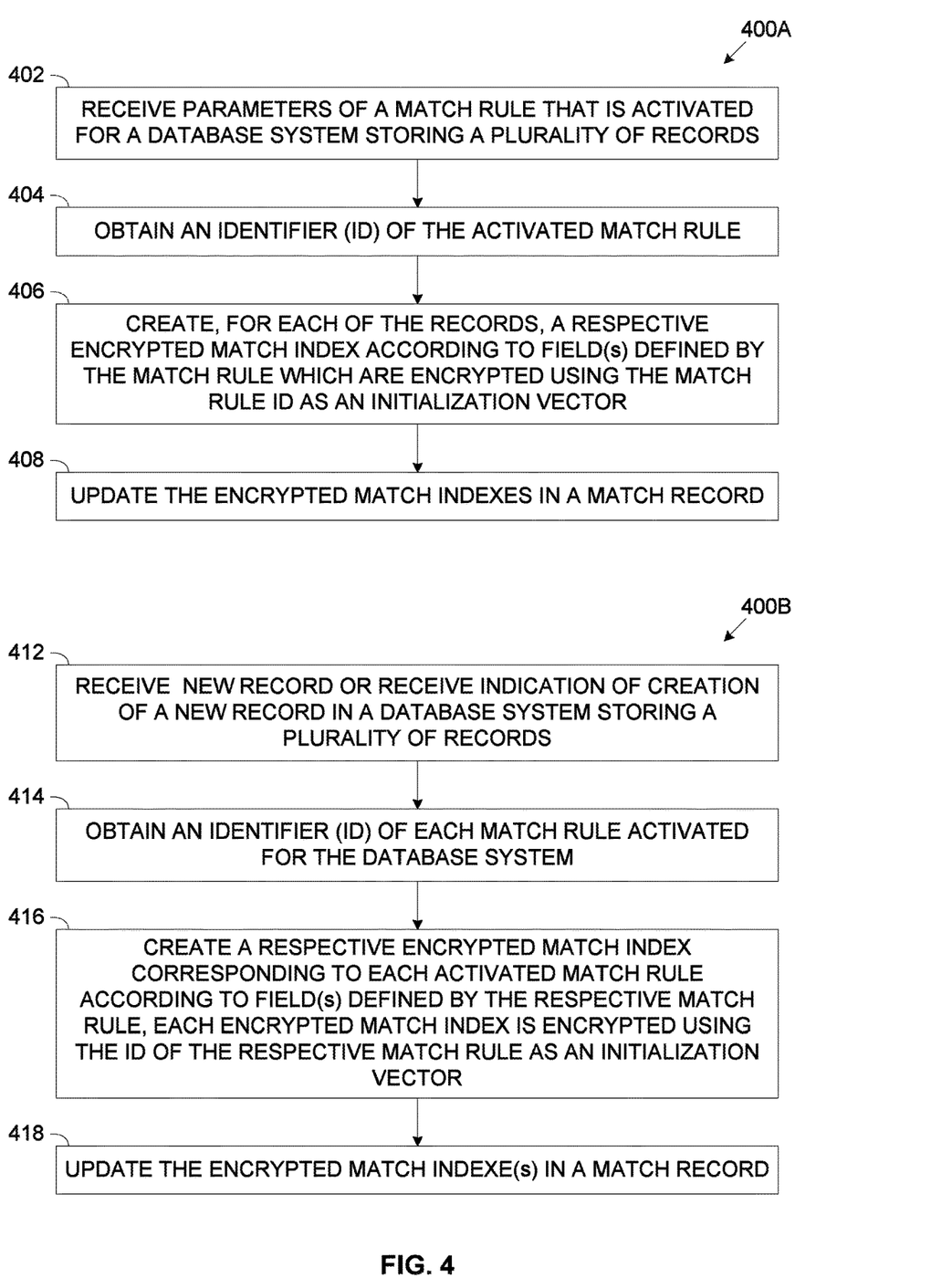
FIG. 4 presents flowcharts of exemplary processes of indexing records stored in a database system by creating encrypted match indexes for the records, in accordance with some embodiments.

Reference is now made to FIG. 4, which presents flowcharts of exemplary processes of indexing records stored in a database system by creating encrypted match indexes for the records, in accordance with some embodiments. Some of the steps of exemplary processes 400A and/or 400B may be performed simultaneously, or in a different order than shown in FIG. 4, as will be understood by a person of ordinary skill in the art. Moreover, while the processes 400A and 400B are described for a single match rule, this should not be construed as limiting since the processes 400A and/or 400B may be expanded for a plurality of match rules which may be received from one or more users.

The exemplary process 400A may be executed to index a plurality records stored in a database system in response to activation of a match rule for the database system, specifically a match rule relating to (keyed for) fields of the records which are enabled for encryption, in particular for deterministic encryption.

According to some embodiments, the process 400A may be executed by an indexing module such as the indexing module 310 executed, implemented and/or utilized in a duplicate detection system such as the duplicate detection system 202 configured to identify duplicate records in a database system such as, for example, the database system 204.

As shown at 402, the indexing module 310, executed, for example, by a duplicate detection system, for example, the duplicate detection system 202, may receive parameters of a match rule activated for a database system, for example, the database system 204 by a user using respective user systems such as the user systems 208.

The parameters may specify, for example, a data entity (i.e., table, object, etc.) comprising records to which the match rule applies, one or more fields in the data entity to which the match rule applies, Boolean or other logic specifying how the match rule should behave, whether blanks or null values should be treated as a match, and other suitable configuration information. Moreover, multiple match rules may define examination of the same fields in the records.

The match rule parameters may be received in one or more data forms and/or formats as known in the art, for example, Hyper-Text Markup Language (HTML), Extensible Markup Language (XML) and/or any other suitable information transfer format.

According to some embodiments, the indexing module 310 may receive match rule parameters updating one or more existing rule which are active for the database system 204.

As shown at 404, the indexing module 310 may obtain the ID of each of the received match rules. The match rule ID may be typically provided together with the match rule. However, in some embodiments, the indexing module 310 may access one or more resources of the database system 204, for example, an active match rules list to obtain the match rule ID.

As shown at 406, the indexing module 310 may create an encrypted match index for each of the records in the database system 204 as defined by the match rule based on the values in the encryption enabled field(s) defined by the match rule, in particular, fields enabled for deterministic encryption. The indexing module 310 may use the ID of the match rule as the initialization vector for the deterministic encryption scheme to create the respective encrypted match index for each of the records.

The indexing module 310 may identify the encryption enabled fields by intercepting one or more of the access operations to the database system 204 performed using one or more of the DAOs defined by a protocol of the database system 204 and/or the access service used to access the database system 204.

As shown at 408, the indexing module 310 may update one or more match records, for example, a file, a table, a list and/or the like to include the encrypted match indexes created for the records according to the match rule. According to some embodiment, the match record may be implemented as a match index column stored, for example, in the data entity and/or data object storing the respective records.

Moreover, the indexing module 310 may initiate one or more bulk operations and/or bulk jobs, for example, bulk inserts, database updates, text manipulation, or other suitable storage approach to store the encrypted match indexes in the match record, for example, the index column. For example, the indexing module 310 may utilize Primary Key (PK) chunking which is highly efficient for fast processing of large datasets.

An exemplary process 400B may be executed to index a newly received and/or a newly created record in a database system, for example, the database system 204.

According to some embodiments, the process 400B may be executed by an indexing module such as the indexing module 310 executed, implemented and/or utilized in the duplicate detection system 202 configured to identify duplicate records in a database system such as, for example, the database system 204.

As shown at 412, the indexing module 310 may receive a new record from a user using a respective user system 208. Optionally, the indexing module 310 may receive indication of a new record created in the database system 204, for example, by a user using a respective user system 208.

The new record may represent one or more new standard fields such as, for example, a contact, an account, a lead, an opportunity and/or the like. The new record may also represent one or more new custom fields previously configured by a user using a respective user system 208 to interact with an application platform such as the application platform 250. The new record may be received using appropriate HTML form data, in XML, or any other suitable information transfer format.

As shown at 414, the indexing module 310 may retrieve one or more match rules currently activated for the records stored in the database system 204, specifically match rules relating to one or more encryption enabled fields of the records which may be pertinent to the new record. The indexing module 310 may further obtain the respective ID of each such activated match rule.

As shown at 416, the indexing module 310 may create a respective encrypted match index for the new record according to each match rules activated for the database system 204 which is applicable to the new record. Specifically, the indexing module 310 may create each encrypted match index based on the based on the values in the encrypted field(s) defined (keyed) by the respective match rule, in particular, field(s) enabled for deterministic encryption. The indexing module 310 may use the ID of the respective match rule as the initialization vector for the deterministic encryption scheme to create the respective encrypted match index for the new record.

As described herein before, the indexing module 310 may identify the encryption enabled fields in the new record by intercepting one or more access operations to the database system 204 which are done using one or more of the DAOs defined by a protocol of the database system 204 and/or the access service used to access the database system 204, for example, the Apache Phoenix configured to enable SQL like access to a non-relational and/or NoSQL database system 204, for example, HBase and/or the like.

As shown at 418, the indexing module 310 may update one or more match records, for example, a file, a table, a list, a match column and/or the like to include each encrypted match index created for the new record according to each of the activated match rule(s).

Reference is made once again to FIG. 1.

As shown at 104, at least some of the plurality of records may be clustered for a respective match rule activated for the database system 204. The process 100, specifically steps 104 through 120 may be repeated for each additional match rule which is activated for the database system 204 and relates to deterministically encrypted fields in the records stored in the database system 204.

According to some embodiments, the clustering of the records such as the group of records 304 may be done by a clustering module such as the clustering module 312 executed, implemented and/or utilized by the duplicate detection system 202.

The clustering module 312 may generate one or more clusters of records from the group of records 304 according to the activated match rules, specifically match rules relating to encrypted fields in the records 304. One or more of the created cluster(s) may include one or more sets each comprising multiple records from the record 304 which have encrypted match indexes corresponding to the respective match rule associated with the cluster.

Continuing the previous example, there are five records stored in the database system 204 which are associated with respective encrypted match indexes created according to the certain match rule defining the combination of the value of the initial of the first name field and the value of the last name field, i.e. [JDear], (JDear], [CSmith], [CSmith] and [DHO]. In such case the clustering module 312 may create a cluster for the certain match rule which comprises two sets, ([JDear], (JDear]), and ([CSmith], [CSmith]) each comprising multiple records corresponding to the certain match rule. Moreover, the clustering module 312 may discard the fifth record [DHO] from the cluster as it does not have at least one another corresponding record.

As shown at 106, which is a conditional step, in case the respective match rule is an exact match rule, the process 100 may branch to 108 and follow a shallow matching sequence. However, in case the respective match rule is a fuzzy match rule, the process 100 may branch to 110 and follow a deep matching sequence.

As shown at 108, in case the respective match rule is an exact match rule, the encrypted match indexes created for the plurality of records may be processed and compared to detect direct match of the encrypted match indexes of multiple records indicating that the matching records may be duplicates. In particular, the records in each set may be compared with each other to identify possible duplicate records.

According to some embodiments, the matching, specifically the direct matching may be done by a matching module such as the matching module 314 executed, implemented and/or utilized by the duplicate detection system 202.

Since the exact match rule defines exact matching and the values are encrypted using deterministic encryption, equal values (plaintext) in respective field(s) of different records may produce equal encrypted values (ciphertext) and hence may produce equal encrypted match indexes. The matching module 314 may therefore simply traverse the encrypted match indexes of the records in each of the set(s) and immediately identify duplicate records having equal encrypted match indexes.

Continuing the previous example, there are five records stored in the database system 204 which are associated with respective encrypted match indexes created according to the certain exact match rule defining the combination of the value of the initial of the first name field and the value of the last name field, i.e. [JDear], (JDear], [CSmith], [CSmith] and [DHO]. In such case the matching module 314 may detect that the encrypted match values of the records [JDear] and (JDear] are equal and may therefore determine that the two records are duplicates. Similarly, the matching module 314 may detect that the encrypted match values of the records [CSmith], [CSmith] are equal and may therefore determine that the two records are also duplicates.

As shown at 110, in case the respective match rule is a fuzzy match rule, the encrypted match indexes created for different records may be first decrypted in order to be compared to identify duplicate records.

A fuzzy match rule may not define an exact direct match of respective values in certain one or more fields of the records 304 but rather a more general match, for example, matching values may have similar content with different representation.

Continuing the previous example, for the five records stored in the database system 204, encrypted match indexes may be created according to a certain match rule which defines examination of a combination of the first name field and the last name field. In such case, the encrypted match indexes created for the records may be based on the combined values, [JohnDear], [JhonnyDear], [CliffordSmith], [CliffSmith] and [DannyHO]. As evident these encrypted match indexes may not match each other even for records having field values comprising the same values content but in different representations.

The encrypted match indexes may be therefore first decrypted.

According to some embodiments, the decryption of the encrypted match indexes may be done by a decryption module such as the decryption module 362 executed, implemented and/or utilized by the duplicate detection system 202.

The decryption module 316 may decrypt the encrypted match indexes of the records in the cluster, specifically the records of each of the sets to recover the respective plaintext values and produce respective decrypted match indexes for these records. Since the encrypted match indexes were initially created according to the deterministic encryption scheme using the ID of the respective match rule as the initialization vector, the decryption module 316 may also apply the same deterministic encryption scheme using the same ID of the respective match rule to decrypt the encrypted match indexes. The decryption module 316 may temporarily store the decrypted match indexes only in volatile memory and may discard these decrypted match indexes after the matching process is complete such that the decrypted values are never persistently stored and are thus secure against possible malicious attacks.

As shown at 112, the decrypted match indexes of the records may be processed and compared to detect a match between decrypted match indexes of multiple records which may indicate that the matching records may be duplicates.

According to some embodiments, the matching, specifically the matching of the decrypted match indexes may be done by a deep matching module such as the deep matching module 318 executed, implemented and/or utilized by the duplicate detection system 202.

The deep matching module 318 may process the decrypted match indexes of the records in each of the sets in the cluster to identify possible duplicate records. The decrypted match indexes may reflect that despite possible different representation, the values in the respective encryption enabled field(s) of at least some of the records in a certain set may include similar content.

Continuing the previous example, the decrypted match indexes of the five records stored in the database system 204 may restore the original plaintext values of the records, i.e., [JohnDear], [JhonnyDear], [CliffordSmith], [CliffSmith]. The deep matching module 318 processing the decrypted match indexes may therefore detect that the decrypted match values [JohnDear] and [JhonnyDear] are matching and may therefore determine that the two records are duplicates. Similarly, the deep matching module 318 may detect that the decrypted match values [CliffordSmith] and [CliffSmith] are matching and may therefore determine that the two records are also duplicates.

As stated herein before, the decrypted match indexes are discarded (deleted, removed) immediately on completion of the deep matching process.

According to some embodiments, the deep matching module 318 may implement, utilize and/or apply one or more external and/or third party matching services, $3^{rd}$ party applications, tools and/or the like, for example, the PB Spectrum platform. The records of the cluster, specifically the decrypted match indexes of the records in the sets of the cluster may be enqueued and transferred to the PB Spectrum platform for deep matching of the decrypted match indexes.

In particular, the decrypted match indexes may be transferred to the PB Spectrum platform using one or more bulk operations and/or bulk jobs to transfer large volumes of data in a significantly short time thus significantly increasing transfer performance, reduce latency and/or the like.

The PB Spectrum platform may respond with a match score which scores each potential duplicate record (candidate) compared to a certain record (suspect).

As shown at 114, which is another conditional step, in case there are one or more additional match rules, the process 100 may branch to step 104 to initiate another cycle for an additional match rule. However, in case there are no additional match rules which need to be processed, the process 100 may branch to 116.

According to some embodiments, some of the steps may be executed in parallel for multiple match rules. For example, while a first cluster created according to a first match rule is processed to identify duplicate records based on detection of matching encrypted/decrypted match indexes (steps 108 and/or 110/112) a second cluster may be created according to a second match rule (step 104).

As shown at 116, an indication of the duplicate records may be output.

According to some embodiments, the duplicate records indication may be output by a duplicate recording module such as the duplicate recording module 320 executed, implemented and/or utilized by the duplicate detection system 202.

The duplicate recording module 320 may collect and record the duplicate records identified by the matching module 314 and/or the deep matching module 318. The duplicate recording module 320 may then output one or more indications of the identified duplicate records. For example, the duplicate recording module 320 may transmit one or more messages indicating the duplicate records to one or more of the user systems 208, for example, a user system 208 operated and/or associated with an IT officer, an operator and/or the like. Additionally and/or alternatively the duplicate recording module 320 may transmit one or more messages indicating the duplicate records to one or more automated systems, services and/or platforms which may initiate one or more operations and/or actions accordingly.

As shown at 118, which is an optional step, set collapsing may be applied to merge sets comprising common records.

According to some embodiments, the set collapsing may be done by a set merging module such as the set merging module 322 executed, implemented and/or utilized by the duplicate detection system 202.

The set merging module 322 may determine that at least some of the records included in one set of the cluster are duplicates of records and/or are common records included in one or more other sets of the cluster and may merge together these sets to a single set. For example, assuming a first set comprises a first record and one or more first additional records determined to be duplicates of the first record. Further assuming a second set comprises a second record and one or more second additional records determined to be duplicates of the second record. In such case the set merging module 322 determines that the first record and the second record are duplicates, the set merging module 322 may apply set collapsing and merge the first and second sets to a single set since if the second record is a duplicate of the second additional record(s) and the first and second records are duplicates, then the first additional record(s) and the second additional record(s) are also duplicates.

As shown at 120, which is an optional step, one or more of the duplicate records may be removed (deleted, discarded) from the database system.

According to some embodiments, removing the duplicate records may be done by a duplicate removal module such as the duplicate removal module 324 executed, implemented and/or utilized by the duplicate detection system 202.

The duplicate removal module 324 may remove from the database system 204 one or more of the duplicates of records identified by the matching module 314 and/or the deep matching module 318 and recorded by the duplicate recording module 320. As such the duplicate removal module 324 may maintain ensure that the data stored in the database 214 is clean, coherent and compact which may significantly increase performance and/or reduce latency in processing, maintenance and/or retrieving data in the database system 204.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms database systems and database access services are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to embodiments. To the extent that section headings are used, they should not be construed as necessarily limiting In addition, any priority document(s) of this application is/are hereby incorporated herein by reference in its/their entirety.

What is claimed is:

1. A computer implemented method of identifying duplicate records stored in a database system, comprising:
   using at least one processor of a database system for:
   generating a plurality of encrypted match indexes for each of a plurality of records stored in the database system, each of the plurality of encrypted match indexes encrypts a value of each encryption enabled field of a respective one of the plurality of records defined by at least one match rule;
   creating a cluster of records comprising at least one set containing at least two records of the plurality of records, the at least two records having respective encrypted match indexes corresponding to the at least one match rule;
   causing identification of duplicate records in the at least one set according to detection of records of the at least one set having respective match indexes matching the at least one match rule; and;
   in case the at least one match rule comprises a fuzzy match rule:
   causing decryption of the encrypted match indexes of each of the records of the at least one set;
   causing identification of duplicate records in the at least one set according to detection of records of the at least one set having decrypted match indexes matching the at least one match rule; and
   outputting an indication of the identified duplicate records.

2. A computer implemented method of identifying duplicate records stored in a database system, comprising:
   using at least one processor of a database system for:
   generating a plurality of encrypted match indexes for each of a plurality of records stored in the database system, each of the plurality of encrypted match indexes encrypts a value of each encryption enabled field of a respective one of the plurality of records defined by at least one match rule;
   creating a cluster of records comprising at least one set containing at least two records of the plurality of records, the at least two records having respective encrypted match indexes corresponding to the at least one match rule;
   causing identification of duplicate records in the at least one set according to detection of records of the at least one set having respective match indexes matching the at least one match rule; and
   outputting an indication of the identified duplicate records
   wherein each encryption enabled field of the respective record is detected by intercepting at least one database access initiated to apply the encryption to the respective field, the at least one database access is initiated using at least one data access object defined by a protocol of the database system.

3. The method of claim 2, wherein the encryption comprises deterministic encryption.

4. The method of claim 2, wherein a unique identifier of the at least one match rule is used as an initialization vector in an encryption scheme used to encrypt the encryption enabled fields in each of the plurality of records.

5. The method of claim 2, further comprising merging a plurality of sets comprising a common record to a single set.

6. The method of claim 2, further comprising removing at least one of the duplicate records from the plurality of records stored in the database system.

7. A database system for automatically identifying duplicate records stored in a database system, comprising:
   a database storing a plurality of records;
   a storage storing a code; and
   at least one processor coupled to the storage for executing the code, the code comprising:
   code instructions t*o generate a plurality of encrypted match indexes for each of a plurality of records stored in the database system, each of the plurality of encrypted match indexes encrypts a value of each encryption enabled field of a respective one of the plurality of records defined by at least one match rule, code instructions to create a cluster of records comprising at least one set containing at least two records of the plurality of records, the at least two records having respective encrypted match indexes corresponding to the at least one match rule, code instructions to cause identification of duplicate records in the at least one set according to detection of records of the at least one set having respective match indexes matching the at least one match rule, and;

wherein the code further comprising:

code instructions to cause decryption of the encrypted match indexes of each of the records of the at least one set in case the at least one match rule comprises a fuzzy match rule;

code instructions to cause identification of duplicate records in the at least one set according to detection of records of the at least one set having decrypted match indexes matching the at least one match rule; and code instructions to output an indication of the identified duplicate records.

8. The database system of claim 7, wherein the encryption comprises deterministic encryption.

9. The database system of claim 7, wherein a unique identifier of the at least one match rule is used as an initialization vector in an encryption scheme used to encrypt the encryption enabled fields in each of the plurality of records.

10. The database system of claim 7, further comprising merging a plurality of sets comprising a common record to a single set.

11. The database system of claim 7, further comprising removing at least one of the duplicate records from the plurality of records stored in the database system.

12. A database system for automatically identifying duplicate records stored in a database system, comprising:
a database storing a plurality of records;
a storage storing a code; and
at least one processor coupled to the storage for executing the code, the code comprising:
  code instructions to generate a plurality of encrypted match indexes for each of a plurality of records stored in the database system, each of the plurality of encrypted match indexes encrypts a value of each encryption enabled field of a respective one of the plurality of records defined by at least one match rule,
  code instructions to create a cluster of records comprising at least one set containing at least two records of the plurality of records, the at least two records having respective encrypted match indexes corresponding to the at least one match rule,
  code instructions to cause identification of duplicate records in the at least one set according to detection of records of the at least one set having respective match indexes matching the at least one match rule, and code instructions to output an indication of the identified duplicate records;

wherein each encryption enabled field of the respective record is detected by intercepting at least one database access initiated to apply to the encryption to the respective field, the at least one database access is initiated using at least one data access object defined by a protocol of the database system.

13. A computer program product comprising computer readable program code to be executed by at least one processor when retrieved from a non-transitory computer readable medium, the program code comprising code instructions to:
  generate a plurality of encrypted match indexes for each of a plurality of records stored in a database system, each of the plurality of encrypted match indexes encrypts a value of each encryption enabled field of a respective one of the plurality of records defined by at least one match rule;
  create a cluster of records comprising at least one set containing at least two records of the plurality of records, the at least two records having a respective encrypted match indexes corresponding to the at least one match rule;
  cause identification of duplicate records in the at least one set according to detection of records of the at least one set having respective match indexes matching the at least one match rule; and
  cause decryption of the encrypted match indexes of each of the records of the at least one set in case the at least one match rule comprises a fuzzy match rule;
  cause identification of duplicate records in the at least one set according to detection of records of the at least one set having decrypted match indexes matching the at least one match rule; and
  output an indication of the identified duplicate records.

14. The computer program product of claim 13, wherein a unique identifier of the at least one match rule is used as an initialization vector in an encryption scheme used to encrypt the encryption enabled fields in each of the plurality of records.

15. The computer program product of claim 13, further comprising code instructions to merge a plurality of sets comprising a common record to a single set.

16. A computer program product comprising computer readable program code to be executed by at least one processor when retrieved from a non-transitory computer readable medium, the program code comprising code instructions to:
  generate a plurality of encrypted match indexes for each of a plurality of records stored in a database system, each of the plurality of encrypted match indexes encrypts a value of each encryption enabled field of a respective one of the plurality of records defined by at least one match rule;
  create a cluster of records comprising at least one set containing at least two records of the plurality of records, the at least two records having a respective encrypted match indexes corresponding to the at least one match rule;
  cause identification of duplicate records in the at least one set according to detection of records of the at least one set having respective match indexes matching the at least one match rule; and
detect each encryption enabled field of the respective record by intercepting at least one database access initiated to apply to the encryption to the respective field, the at least one database access is initiated using at least one data access object defined by a protocol of the database system;
  output an indication of the identified duplicate records.

17. The computer program product of claim 16, wherein the encryption comprises deterministic encryption.

18. The computer program product of claim 16, further comprising code instructions to remove at least one of the duplicate records from the plurality of records stored in the database system.

* * * * *

UNITED STATES PATENT AND TRADEMARK OFFICE
CERTIFICATE OF CORRECTION

| | | |
|---|---|---|
| PATENT NO. | : 11,354,285 B2 | Page 1 of 1 |
| APPLICATION NO. | : 16/848878 | |
| DATED | : June 7, 2022 | |
| INVENTOR(S) | : Chenghung Ker et al. | |

It is certified that error appears in the above-identified patent and that said Letters Patent is hereby corrected as shown below:

On the Title Page

Item (73) Assignee:
"salesforee.com, inc."
Should be changed to:
-- salesforce.com, inc. --

Signed and Sealed this
Seventeenth Day of January, 2023

Katherine Kelly Vidal
*Director of the United States Patent and Trademark Office*